United States Patent
Brindel et al.

(10) Patent No.: US 7,035,542 B2
(45) Date of Patent: Apr. 25, 2006

(54) ALL-OPTICAL HIGH BIT-RATE MULTIPLEXER

(75) Inventors: Patrick Brindel, Longpont S/Orge (FR); Bruno Lavigne, Antony (FR); Olivier Leclerc, Saint Michel S/Orge (FR)

(73) Assignee: Avanex Corporation, Fremont, CA (US)

( * ) Notice: Subject to any disclaimer, the term of this patent is extended or adjusted under 35 U.S.C. 154(b) by 577 days.

(21) Appl. No.: 10/067,933

(22) Filed: Feb. 8, 2002

(65) Prior Publication Data

US 2002/0122229 A1    Sep. 5, 2002

(30) Foreign Application Priority Data

Mar. 1, 2001    (EP)    ................... 01440052

(51) Int. Cl.
*H04J 4/00*    (2006.01)
*H04J 14/00*    (2006.01)

(52) U.S. Cl. .......................... 398/75; 398/52
(58) Field of Classification Search ................ 398/75, 398/74, 47, 52
See application file for complete search history.

(56) References Cited

U.S. PATENT DOCUMENTS

| | | | |
|---|---|---|---|
| 5,177,630 | A | 1/1993 | Goutzoulis et al. |
| 5,726,789 | A * | 3/1998 | Horiuchi et al. ............ 398/191 |
| 6,275,322 | B1 * | 8/2001 | Tai .............................. 359/279 |
| 6,388,781 | B1 * | 5/2002 | Saunders ..................... 398/79 |
| 6,614,582 | B1 * | 9/2003 | Mikkelsen et al. ......... 359/326 |
| 6,678,479 | B1 * | 1/2004 | Naoe et al. .................. 398/183 |
| 6,823,178 | B1 * | 11/2004 | Pleasant et al. ............. 455/119 |

FOREIGN PATENT DOCUMENTS

JP    09 230395 A    9/1997

OTHER PUBLICATIONS

M. Daza, et al., "All-Optical WDM-to-TDM Conversion with Total Capacity of 33 Gb/s for WDM Network Links", IEEE Journal of Selected Topics in Quantum Electronics, vol. 3, No. 5, Oct. 1997.*
Zhang J-G: "Using advanced optical multiple-access tecniques in high-speed avionic local area networks for future aircraft applications Part II: Optical time-division multiple-access networks—Part II: Optical time-division multiple-access networks", ISA Transactions, Instrument Society of America. Pittsburgh, US, vol. 36, No. 4, 1997, pp. 321-338.

* cited by examiner

*Primary Examiner*—Jason Chan
*Assistant Examiner*—Shi K. Li
(74) *Attorney, Agent, or Firm*—Patterson & Sheridan, LLP

(57) ABSTRACT

The present invention propose to use an optical multiplexer associated with an optical clock as a wavelength converter. Each RZ coded tributary will be carried by a single wavelength (channel) passively interleaved with the others without interferometric interaction hence achieving a not necessarily perfect OTDM. This input data stream as optical data signal composed of different wavelengths is then launched on at least one data access of said optical multiplexer used as a wavelength converter. An optical clock at the desired bit-rate is launched on the probe access of said optical multiplexer synchronously to the multi-wavelength data stream. At the output, the initial clock wavelength is converted on data signal using the gain conversion property of the optical multiplexer. In such a way, a data stream of substantially higher bit-rate is obtained while due to a very precise synchronization a lost of data is minimized.

9 Claims, 1 Drawing Sheet

ALL-OPTICAL HIGH BIT-RATE MULTIPLEXER

TECHNICAL FIELD

The present invention relates to an optical module and a method for synchronizing an optical data signal. The invention is based on a priority application EP 01 440 052.7 which is hereby incorporated by reference.

BACKGROUND OF THE INVENTION

As wavelength division multiplexing (WDM) network technology matures, ultra fast optical time division multiplexed (OTDM) packet network are attracting attention because they offer more flexible and efficient communication than WDM networks. It should be noted that all-optical signal processing functions necessary for ultra fast OTDM system ($\leqq 40$ Gbit/s) are also beneficial even in WDM optical communication systems. If simple and reliable all-optical signal processing technologies are available, these may improve the system design of transmission schemes limited by the electronic devices and instruments. Here, the key is the novel kinds of optical devices that make possible some simple but ultra fast signal processing functions, including the generation of stable ultra short light pulses, beyond the speed limit of the present electronics.

In general, information is coded in the electrical using multiple stage of electronic multiplexer (ETDM). Today, it seems commercially practicable to operate with such a scheme at bit-rates up to 20 Gbit/s and 40 Gbit/s in lab version. However, the main problem is the actual and non-degraded conversion of the data from the electrical to the optical domain. For that purpose, broadband intensity modulators often based on LiNbO3 intensity modulator or integrated electro-absorption modulator which require large peak to peak voltage driver have been considered.

An alternative solution is the use of OTDM (RZ format) using passive optical couplers and delay-lines, which has the main advantage of using lower bitrate electronic components. This well-known solution has a potential to enable very high bit-rate at low costs. However, some problems are still not satisfactorily solved, namely that extinction ratio between pulses (requiring best quality pulse sources) are sufficient to minimize possible interferometric noise and that temporal interleave between tributaries are good enough.

SUMMARY OF THE INVENTION

It is an object of the present invention to improve the OTDM technique allowing to increase substantially the bit-rate of data stream without suffering from restrictions due to side effects.

This object is attained by an optical module containing an optical multiplexer with at least an optical data access, an optical probe access and an optical data output. An optical data signal carried by n different interleaved wavelength channels each at a bit-rate F/n as well as an optical clock signal at frequency F and at wavelength $\lambda_c$ are launched respectively on said at least one optical data access and said optical probe access such that in said optical multiplexer said optical data signal is synchronized with said optical clock signal to give a converted optical time domain multiplexed signal on said optical data output at a bit-rate F and at wavelength $\lambda_c$.

Furthermore, its object is also achieved by a method for synchronizing an optical data signal carried by n different interleaved wavelength channels each at a bit-rate F/n using an optical clock signal at frequency F and at wavelength $\lambda_c$ by launching said optical data signal and optical clock signal respectively on at least one optical data access and an optical probe access of an optical multiplexer, while in said optical multiplexer said optical data signal is converted to give an optical time domain multiplexed signal on said optical data output at a bit-rate F and at wavelength $\lambda_c$.

The present invention propose to use an optical multiplexer associated with an optical clock as a wavelength converter. Each RZ coded tributary will be carried by a single wavelength (channel) passively interleaved with the others without interferometric interaction hence achieving a not necessarily perfect OTDM. This input data stream as optical data signal composed of different wavelengths is then launched on at least one data access of said optical multiplexer used as a wavelength converter. An optical clock at the desired bit-rate is launched on the probe access of said optical multiplexer synchronously to the multi-wavelength data stream. At the output, the initial clock wavelength is converted on data signal using the gain conversion property of the optical multiplexer. In such a way, a data stream of substantially higher bit-rate is obtained while due to a very precise synchronization a lost of data is minimized.

Further advantageous features of the invention are defined in the dependent claims and will become apparent form the following description and the drawing.

BRIEF DESCRIPTION OF THE DRAWINGS

One embodiment of the invention will now be explained in more detail with reference to the accompanying drawing, in which.

Figure 1:
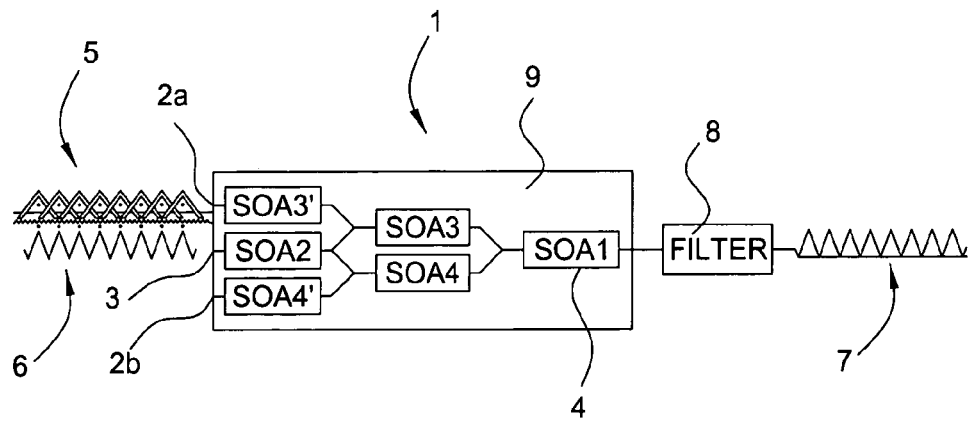
FIG. 1 is a schematic view of an optical time domain multiplex principle according to the present invention.

On FIG. 1 is shown a schematic view of an optical time domain multiplex principle according to the present invention using an optical module containing an optical multiplexer 1 acting as wavelength converter. Such optical multiplexer 1 shows at least one optical data access 2a, 2b (here two but could be even more) and an optical probe access 3. An optical data signal 5 made of a multi-wavelength data stream carried by n different previously interleaved wavelength channels (in this example n=4) is launched on said at least one optical data access 2a, 2b. These wavelength channels may well be chosen out of the ITU grid and be possibly close-by if not contiguous. As suggested, they may well be launched in a parallel way at more then one optical data access. Each of these channels shows a bit-rate of F/n while F is the frequency of an optical clock signal 6 and at wavelength $\lambda_c$ which is launched on said optical probe access 3. Laffer is performed such that it is synchronous to said optical data signal 5.

In said optical multiplexer 1, the initial optical clock signal 6 is converted to give a time domain multiplexed signal 7 on said optical data output 4 at a bit-rate F and at same wavelength $\lambda_c$. As an optical multiplexer 1 can be used a semiconductor optical amplifier Mach-Zehnder type interferometer 9 (SOA-Mzi). Alternately can be also used a non-linear optical loop mirror. It is take advantage of the gain conversion property of said optical multiplexer 1.

If for instance 4 channels at 10 Gbit/s passively interleaved are launched on the optical data access as a multi-wavelength data stream, they will be converted into a single 40 Gbit/s data stream inside said optical multiplexer 1. The new carrier wavelength is that of the optical clock signal $\lambda_c$ (probe access). A filter is placed after said optical data output 4 of the optical multiplexer 1 to eliminate any rest contribution of the initial multi-wavelength data stream. This filter is namely centered around $\lambda_c$, let passing only the converted optical time domain multiplexed signal 7.

Figure 2:
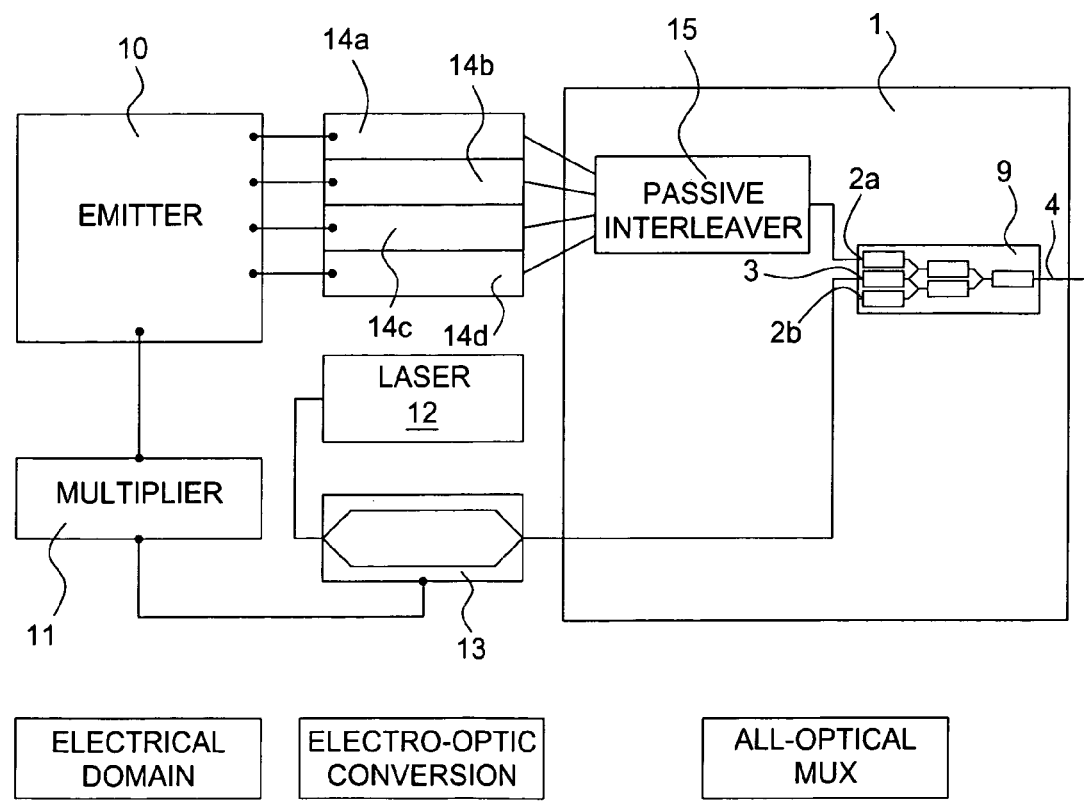
FIG. 2 is a schematic view of a realization of an optical time domain multiplex according to FIG. 1.

On FIG. 2 is shown a schematic realization of a time domain multiplex according to the present invention. A several channels based emitter 10 is used to synthesize data signals carried by in this example four (n=4) different wavelength channels 14a–14d at bit-rate F/n (here e.g. 10 Gbit/s). The same emitter 10 is used to synthesize a clock signal at same frequency F/n. This clock signal is launched into a multiplier 11 (here quadrupler) which will run an integrated electro-absorption modulator 13 like a $LiNbO_3$ intensity modulator Mach-Zehnder in combination with a laser 12 like a DFB-one (distributed feedback laser) giving an optical clock signal at frequency F. Alternately, the quadrupler could be replaced by a simple frequency doubler if the bias operating point of the $LiNbO_3$ Mach-Zehnder is chosen at the minimum of its transfer function. This allows also to obtain an optical clock with high extinction ratio at the wished frequency F and wavelength $\lambda_c$.

The optical multiplexer 1 comprises a passive interleaver 15 which permits to interleave the different optical wavelength channels into a single multi-wavelength data stream. Latter is then launched into one or more optical data access 2a, 2b of a SOA-Mzi 9. Parallel to that and in a synchronous way is launched said optical clock signal into an optical probe access 3 of said interferometer 9. The multi-wavelength data stream and the optical clock signal will be converted in the interferometer 9 to give an optical time domain multiplexed signal on the optical data output 7 of said interferometer 9 at wavelength $\lambda_c$ and bit-rate F (in the present example 40 Gbit/s).

It is possible with an optical multiplexer 1 according to the present invention to perform a method for synchronizing an optical data signal 5 carried by n different interleaved wavelength channels each at bit-rate F/n. An optical clock signal 6 at frequency F and wavelength $\lambda_c$ is used while both said optical data signal 5 and optical clock signal 6 are launched respectively on at least one optical data access 2a, 2b and optical probe access 3 of said optical multiplexer 1. The synchronization is performed inside the optical multiplexer 1 to give a converted optical time domain multiplexed signal 7 on said optical data output 4 at a bit-rate F and at wavelength $\lambda_c$. It may be of advantage afterwards, to filter out on said optical data output 4 all other optical signals except the ones at wavelength $\lambda_c$ by the use of a filter 8.

The use of such an optical multiplexer 1 allows to increase substantially the bit-rate of an optical data stream without being disadvantaged by some interferometric noise. It allows to benefit of single polarization and to keep in a rigorous way the data stream equally spaced through the applied re-synchronization.

The invention claimed is:

1. An optical time domain multiplexer system, comprising:
    an optical multiplexer with at least one optical data access, an optical probe access and an optical data output and including a semiconductor optical amplifier Mach-Zehnder interferometer having:
        a first set of at least three semiconductor optical amplifiers configured to receive n different interleaved wavelength channels, each at a bit-rate F/n, and an optical clock signal, having a frequency F and a wavelength $\lambda_c$,
        a second set of at least two semiconductor optical amplifiers, wherein the first set and the second set are in series with one another, and
        a third set of at least one semiconductor optical amplifier configured to output a converted optical time domain multiplexed signal at a bit-rate of F and at a wavelength of $\lambda_c$, wherein the second set and the third set are in series with one another,
    wherein an optical data signal carried by the n different interleaved wavelength channels and the optical clock signal are launched respectively on said at least one optical data access and said optical probe access such that in said optical multiplexer said optical data signal is synchronized with said optical clock signal to produce the converted optical time domain multiplexed signal on said optical data output.

2. The optical time domain multiplexer system of claim 1, further comprising an optical filter on said optical data output and configured to pass only the converted optical time domain multiplexed signal at a wavelength of $\lambda_c$.

3. The optical time domain multiplexer system of claim 1, further comprising an optical clock that includes a multiplier and a laser and configured to receive a clock signal at a frequency F/n and generate said optical clock signal at frequency F.

4. The optical time domain multiplexer system of claim 3, wherein the multiplier is configured to run an integrated electro-absorption modulator in combination with the laser.

5. The optical time domain multiplexer system of claim 4, wherein the integrated electro-absorption modulator is a $LiNbO_3$ Mach-Zehnder intensity modulator.

6. The optical time domain multiplexer system of claim 4, wherein the laser is a distributed feedback laser.

7. The optical time domain multiplexer system of claim 3, further comprising an emitter configured to generate the clock signal at a frequency F/n received by the optical clock.

8. The optical time domain multiplexer system of claim 1, wherein the optical multiplexer includes a first optical data access and a second optical data access, and the n different interleaved wavelength channels are launched in parallel on both the first and the second optical data access.

9. An optical module comprising:
    an optical multiplexer with at least one optical data access, an optical probe access and an optical data output, wherein an optical data signal carried by n different interleaved wavelength channels, each at a bit-rate F/n, as well as an optical clock signal at frequency F and at a wavelength $\lambda_c$ are launched respectively on said at least one optical data access and said optical probe access such that in said optical multiplexer said optical data signal is synchronized with said optical clock signal to give a converted optical time domain multiplexed signal on said optical data output at a bit-rate of F and at a wavelength of $\lambda_c$; and
    an optical clock that includes a multiplier and a laser and configured to receive a clock signal at a frequency F/n and generate said optical clock signal at frequency F, wherein said optical multiplexer includes a semiconductor optical amplifier Mach-Zehnder interferometer, comprising:
    a first set of at least three semiconductor optical amplifiers configured to receive the n different interleaved wavelength channels and said optical clock signal;

a second set of at least two semiconductor optical amplifiers, wherein the first set and the second set are in series with one another; and a third set of at least one semiconductor optical amplifier configured to output the converted optical time domain multiplexed signal at a bit-rate of F and at a wavelength of $\lambda_c$, wherein the second set and the third set are in series with one another.

* * * * *